United States Patent
Liu et al.

(10) Patent No.: US 11,575,865 B2
(45) Date of Patent: Feb. 7, 2023

(54) PROCESSING IMAGES CAPTURED BY A CAMERA BEHIND A DISPLAY

(71) Applicant: Samsung Electronics Company, Ltd., Suwon si (KR)

(72) Inventors: Changgeng Liu, San Jose, CA (US); Ernest Rehmatulla Post, San Francisco, CA (US); Sajid Sadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 16/935,946

(22) Filed: Jul. 22, 2020

(65) Prior Publication Data
US 2021/0029336 A1    Jan. 28, 2021
US 2021/0329206 A2    Oct. 21, 2021

Related U.S. Application Data

(60) Provisional application No. 62/879,077, filed on Jul. 26, 2019.

(51) Int. Cl.
*H04N 9/64* (2006.01)
*H04N 5/225* (2006.01)
(Continued)

(52) U.S. Cl.
CPC .......... *H04N 9/646* (2013.01); *G06T 5/003* (2013.01); *H04N 5/2257* (2013.01);
(Continued)

(58) Field of Classification Search
CPC .. H04N 9/646; H04N 5/2257; H04N 5/23229; H04N 9/07; G06T 5/003; G06T 2207/10024
See application file for complete search history.

(56) References Cited

U.S. PATENT DOCUMENTS

| | | |
|---|---|---|
| 3,971,065 A | 7/1976 | Bayer |
| 6,454,414 B1 | 9/2002 | Ting |
| (Continued) | | |

FOREIGN PATENT DOCUMENTS

| | | |
|---|---|---|
| WO | WO 2010081229 A1 | 7/2010 |
| WO | WO 2017117152 A1 | 7/2017 |
| WO | WO 2021/122471 A1 | 6/2021 |

OTHER PUBLICATIONS

Lai, Richard, "Oppo's under-screen camera is real and taking photos in Shanghai," https://www.engadget.com/2019-06-26-oppo-under-screen-camera-mwc-shanghai.html, Jun. 26, 2019, 8 pgs.

(Continued)

*Primary Examiner* — Twyler L Haskins
*Assistant Examiner* — Fayez A Bhuiyan

(57) ABSTRACT

A method includes capturing, by a camera disposed behind a display panel of an electronic device, an original image through a semi-transparent pixel region of the display panel. The original image includes one or more color components. The method further includes determining, for a plurality of pixel regions of the original image, a point spread function (PSF) for each of the one or more color components. The method further includes performing, for the plurality of pixel regions of the original image, a deconvolution of each of the one or more color components of the original image based at least in part on their respective PSFs. The method thus includes generating a reconstructed image corresponding to the original image based on the deconvolutions of the one or more color components of the plurality of pixel regions of the original image.

20 Claims, 9 Drawing Sheets

(51) Int. Cl.
*G06T 5/00* (2006.01)
*H04N 5/232* (2006.01)
*H04N 9/07* (2006.01)

(52) U.S. Cl.
CPC .......... *H04N 5/23229* (2013.01); *H04N 9/07* (2013.01); *G06T 2207/10024* (2013.01)

(56) References Cited

U.S. PATENT DOCUMENTS

| | | |
|---|---|---|
| 7,053,613 B2 | 5/2006 | Lin |
| 8,041,142 B2 | 10/2011 | Schafer |
| 8,582,911 B2 | 11/2013 | Kim |
| 8,587,703 B2 | 11/2013 | Lelescu |
| 9,582,862 B2 | 2/2017 | Zhang |
| 9,911,208 B2 | 3/2018 | Zhou |
| 9,916,656 B2 | 3/2018 | Choi |
| 9,947,901 B2 | 4/2018 | Shedletsky |
| 9,948,849 B2 | 4/2018 | Kim |
| 10,083,335 B2 | 9/2018 | Zhang |
| 10,178,381 B2 | 1/2019 | Hall |
| 10,191,577 B2 | 1/2019 | Choi |
| 10,416,087 B2 | 9/2019 | Zhang |
| 10,595,724 B2 | 3/2020 | Lai |
| 10,642,059 B2 | 5/2020 | Soskind |
| 10,656,437 B2 | 5/2020 | Limon |
| 11,003,088 B2 | 5/2021 | Sorg |
| 2003/0002746 A1 | 1/2003 | Kusaka |
| 2006/0103951 A1 | 5/2006 | Bell |
| 2006/0256226 A1 | 11/2006 | Alon |
| 2008/0013850 A1 | 1/2008 | Sakurai |
| 2008/0068660 A1 | 3/2008 | Loce |
| 2008/0165261 A1* | 7/2008 | Kamo .................. H04N 5/3572 348/E5.051 |
| 2008/0166115 A1 | 7/2008 | Sachs |
| 2008/0218597 A1 | 9/2008 | Cho |
| 2008/0292135 A1 | 11/2008 | Schafer |
| 2009/0147111 A1 | 6/2009 | Litvinov |
| 2009/0263043 A1 | 10/2009 | Cristobal |
| 2010/0073518 A1 | 3/2010 | Yeh |
| 2010/0188528 A1 | 7/2010 | Iwata |
| 2011/0019056 A1 | 1/2011 | Hirsch |
| 2011/0075257 A1 | 3/2011 | Hua |
| 2011/0221888 A1 | 9/2011 | Choi |
| 2011/0285680 A1 | 11/2011 | Nakamura |
| 2012/0162490 A1* | 6/2012 | Chung ............. H04N 5/232933 348/E5.037 |
| 2013/0010077 A1 | 1/2013 | Nguyen |
| 2013/0147778 A1 | 6/2013 | Ninan |
| 2013/0182062 A1 | 7/2013 | Son |
| 2013/0308007 A1 | 11/2013 | Tanaka |
| 2013/0321686 A1 | 12/2013 | Tan |
| 2015/0049165 A1 | 2/2015 | Choi |
| 2015/0207962 A1 | 7/2015 | Sugimoto |
| 2016/0180510 A1 | 6/2016 | Grau |
| 2016/0248975 A1 | 8/2016 | Choi |
| 2016/0277658 A1* | 9/2016 | Kim ................... H04N 5/23229 |
| 2016/0371821 A1 | 12/2016 | Hayashi |
| 2017/0076430 A1 | 3/2017 | Xu |
| 2017/0104897 A1 | 4/2017 | Kang |
| 2017/0212613 A1 | 7/2017 | Hwang |
| 2018/0038768 A1 | 2/2018 | Hofmann |
| 2018/0116500 A1 | 5/2018 | Escalier |
| 2018/0129061 A1 | 5/2018 | Shinohara |
| 2018/0198980 A1* | 7/2018 | Takagi ............... H04N 5/22525 |
| 2018/0211420 A1 | 7/2018 | Yoo |
| 2019/0212544 A1 | 7/2019 | Heber |
| 2019/0327417 A1 | 10/2019 | Moriuchi |
| 2019/0355101 A1 | 11/2019 | Chen |
| 2020/0166807 A1 | 5/2020 | Sasaki |
| 2020/0169725 A1 | 5/2020 | Hua |
| 2020/0209604 A1 | 7/2020 | Chen |
| 2020/0389575 A1 | 12/2020 | Gove |
| 2021/0029336 A1 | 1/2021 | Liu |
| 2021/0152735 A1 | 5/2021 | Zhou |
| 2021/0199952 A1 | 7/2021 | Cho |
| 2022/0029637 A1 | 9/2022 | Huang |

OTHER PUBLICATIONS

Levin, A. et al., "Image and Depth from a conventional Camera with a Coded Aperture," ACM Transactions on Graphics, vol. 26, No. 3, Article 70, Publication date Jul. 2007, DOI 10.1145/1239451.123952, http://doi.acm.org/10.1145/1239451.1239521, 9 pgs.

Hong, J., et al., "Three-dimensional display technologies of recent interest: principles, status, and issues [Invited]," (Doc. ID 152226), Applied Optics, vol. 50, No. 34, , Dec. 1, 2011, https://www.researchgate.net/publication/51919272, DOI: 10.1364/AO.50.000H87, 0003-6935/11/340H87, ©0 2011 Optical Society of America, pp. H87-H115 (30 pages.)

Ren, Ng, "Digital light field photography," PhD dissertation, Stanford University, Jul. 2006, 203 pgs.

Qin, Zong, et al., "See-Through Image Blurring of Transparent Organic Light-Emitting Diodes Display: Calculation Method Based on Diffraction and Analysis of Pixel Structures," Journal of Display Technology, vol. 12, No. 11, Nov. 2016, Digital Object Identifier 10.1109/JDT.2016.2594815, 1551-319X © 2016 IEEE, pp. 1242-1249 (9 pgs).

Richardson, William Hadley, "Bayesian-Based Iterative Method of Image Restoration," Journal of Optical Society of America, vol. 62, No. 1, Jan. 1972, pp. 55-59 (5 pgs).

Lucy, L. B., "An Iterative Technique for the Rectification of Observed Distributions," The Astronomical Journal, vol. 79, No. 6, Jun. 1974, © American Astronomical Society, provided by the NASA Astrophysics Data System, pp. 745-754 (10 pgs).

Heide, Felix, et al., "ProxImaL: Efficient Image Optimization Using Proximal Algorithms," SIGGRAPH 16 Technical paper, Jul. 24-28, 2016, Anaheim, CA. SIGGRAPH '16 Technical Paper, Jul. 24-28, 2016, Anaheim, CA, ISBN: 978-1-4503-4279-7/16/07 DOI: http://dx.doi.org/10.1145/2897824_2925875, 15 pages.

Sitzmann, Vincent., et al., "End-to-End Optimization of Optics and Image Processing for Achromatic Extended Depth of Field and Super-Resolution Imaging," © 2018 ACM 0730-0301/2018/8-ART114, https://doi.org/10.1145/31975517.3201333, ACM Transactions on Graphics vol. 37, No. 4, Article 114, Publication Aug. 2018, pp. 114:1-114:13 (13 pgs.).

International Search Report and Written Opinion for International Application No. PCT/KR2020/009807, dated Oct. 26, 2020.

European Search Report in EP 20846484.2, dated Mar. 14, 2022.

Yang, Hang, Zhongbo Zhang, and Yujing Guan. "An adaptive parameter estimation for guided filter based image deconvolution." *Signal Processing* 138 (2017): 16-26. dated Mar. 7, 2017.

Youmaran, R., and A. Adler. "Combining regularization frameworks for image deblurring: optimization of combined hyper-parameters." In *Canadian Conference on Electrical and Computer Engineering 2004 ( IEEE Cat. No. 04CH37513)*, vol. 2, pp. 723-726. IEEE, 2004. dated May 2, 2004.

Non-Final Office Action in U.S. Appl. No. 17/380,995, dated Jun. 22, 2022.

PCT Search Report and written decision in PCT/KR2022/001024, dated May 10, 2022.

PCT Search Report and Written Decision in PCT/KR2022/001920, dated May 13, 2022.

Non-Final Office Action in U.S. Appl. No. 17/176,535, dated Aug. 16, 2022.

Final Office Action in U.S. Appl. No. 17/176,535, dated Nov. 7, 2022.

* cited by examiner

US 11,575,865 B2

PROCESSING IMAGES CAPTURED BY A CAMERA BEHIND A DISPLAY

PRIORITY

This application claims the benefit under 35 U.S.C. § 119(e) of U.S. Provisional Patent Application No. 62/879,077, filed 26 Jul. 2019, which is incorporated herein by reference.

TECHNICAL FIELD

This disclosure relates generally to electronic displays, and, more particularly, to processing images captured by a camera behind the electronic displays.

BACKGROUND

Electronic displays, such as active matrix liquid crystal displays (AMLCDs), active matrix organic light emitting displays (AMOLEDs), and micro-LED displays are typically the types of the displays that are deployed for use in personal electronic devices (e.g., mobile phones, tablet computers, smartwatches, and so forth). Such personal electronic devices may generally include a front-facing camera, which may be disposed adjacent to the display, and may be utilized most often by users to capture self-portraits (e.g., "selfies"). However, as front-facing camera systems grow in complexity (e.g., depth cameras), more and more of the area designated for the display of the electronic device may be traded off to expand the area designated for the camera system. This may lead to a reduction in resolution and viewing area of the display.

DESCRIPTION OF EXAMPLE EMBODIMENTS

Figure 1:
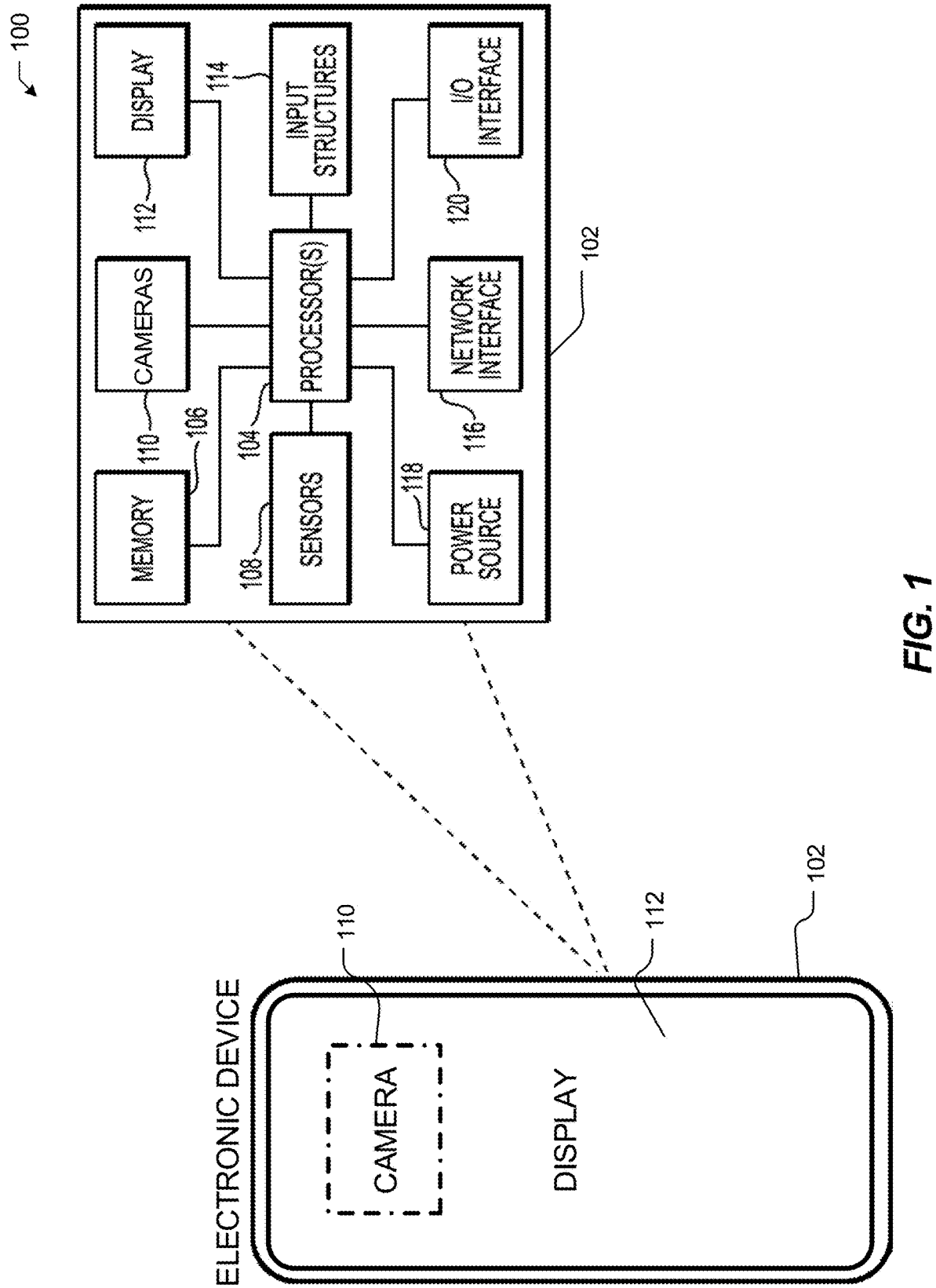
FIG. 1 illustrates an example electronic device.

The present embodiments are directed toward reconstructing images captured by a camera disposed behind a display of an electronic device. In particular embodiments, the electronic device may capture, by a camera disposed behind a display panel of the electronic device, an original image through a semi-transparent (or transparent, partially transparent, etc.) region of the display panel. In particular embodiments, the original image may include a number of color components, and more specifically (R)ed color components, (G)reen color components, and (B)lue color components. In some implementations, the camera determines the bit depth. In particular embodiments, the original image may include a bit depth N=10, which incorporates various color components. In particular embodiments, other values for the bit depth are possible (e.g., N=2, N=8, or N=12, etc.). In particular embodiments, the electronic device may also determine, for a number of pixel regions of the original image, a point spread function (PSF) for each of the number of color components. In particular embodiments, the electronic device may determine the PSF for each of the number of color components by selecting, from a memory of the electronic device, a plurality of premeasured PSFs corresponding to the number of color components, respectively. In particular embodiments, the respective PSFs may be premeasured based on a predetermined calibration process performed with respect to the camera and the display panel.

In particular embodiments, electronic device may then perform, for the number of pixel regions of the original image, a deconvolution of each of the number of color components of the original image based on their respective PSFs. In particular embodiments, the electronic device may perform the deconvolution of each of the number of color components by performing a Richardson-Lucy deconvolution of each of the number of color components. In particular embodiments, the electronic device may perform the deconvolution of each of the number of color components by performing a Tikhonov regularized inverse filter deconvolution of each of the number of color components. In particular embodiments, the electronic device may then generate a reconstructed image corresponding to the original image based on the deconvolutions of the number of color components of the number of pixel regions of the original image. In particular embodiments, the electronic device may generate the reconstructed image corresponding to the original image by removing a blurring effect of the original image. In particular embodiments, the electronic device may also generate the reconstructed image corresponding to the original image by performing a color correction of each of the number of color components of the number of pixel regions of the original image.

In this way, the present embodiments may increase the viewing area and the resolution of the display of the electronic device by disposing one or more front-facing cameras of the electronic device behind the display. For example, because of the increase in display area (e.g., having eliminated the display area typically designated for the one or more front-facing cameras), the electronic device may further provide for improved graphical user interfaces (GUI) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device, as well as allow a user of the electronic device to display higher resolution images on the display of the electronic device. Still further, because the one or more front-facing cameras may be placed behind the display, the present techniques may allow the one or more front-facing cameras to be placed anywhere (e.g., in a center area of the display), as opposed to in a corner or along an edge of the display of the electronic device. This may provide an improved user experience and/or GUI, such as by directing a user taking a selfie to gaze at the center area of the display and further by giving the impression of eye-to-eye contact with another user when the user is participating in a videoconference, a videotelphonic exchange, or other video-streaming service.

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms for providing interactive music conducting and composing activity through intelligence based learning progression. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind or underneath (e.g., as indicated by the dashed lines of electronic device 100) the display 112 (e.g., one or more of the cameras 110 may be completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Figure 2:
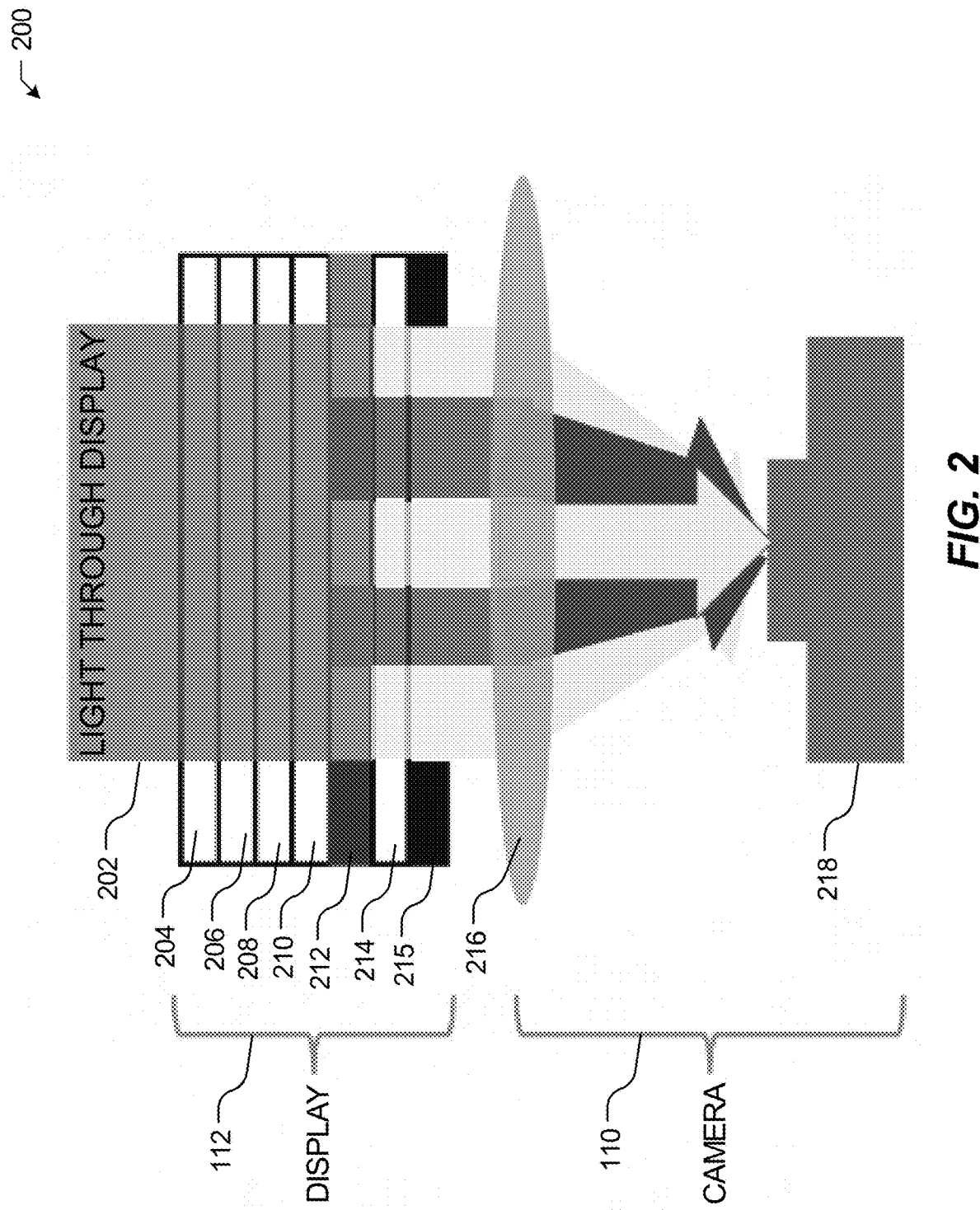
FIG. 2 illustrates a diagram of a light path as the light path passes through each individual layer of a display of the electronic device.

FIG. 2 illustrates a diagram 200 of a light path 202 as the light path 202 passes through each individual layer of the display 112. As illustrated by FIG. 2, in particular embodiments, the display 112 and/or display panel 112 may include, among other layers, a cover glass 204, one or more polarizers 206, a quarter waveplate 208, an encapsulation layer 210, an OLED layer 212, a thin-film transistor (TFT) layer 214, and a reflection film layer 215. In particular embodiments, the light path 202 may be allowed to pass through the display 112 when, for example, a portion of the reflection layer 215 is removed. In particular embodiments, as the light path 202 passes through the layers 204-215 of the display 112, the light path 202 may be modulated periodically by subpixels of the display 112 (e.g., RGB color region of the display 112), and due to a spacing between the subpixels of the display 112, a phase delay of the light path 202 may also be introduced. Such periodic modulation of the light path 202 may lead to diffraction blurs and color dispersion with respect to the light path 202 being passed through the camera lens 216 and detected by the image sensor 218. The diffraction and dispersion effects may degrade images captured by the camera 110 disposed underneath and/or behind the display 112.

Figure 3:
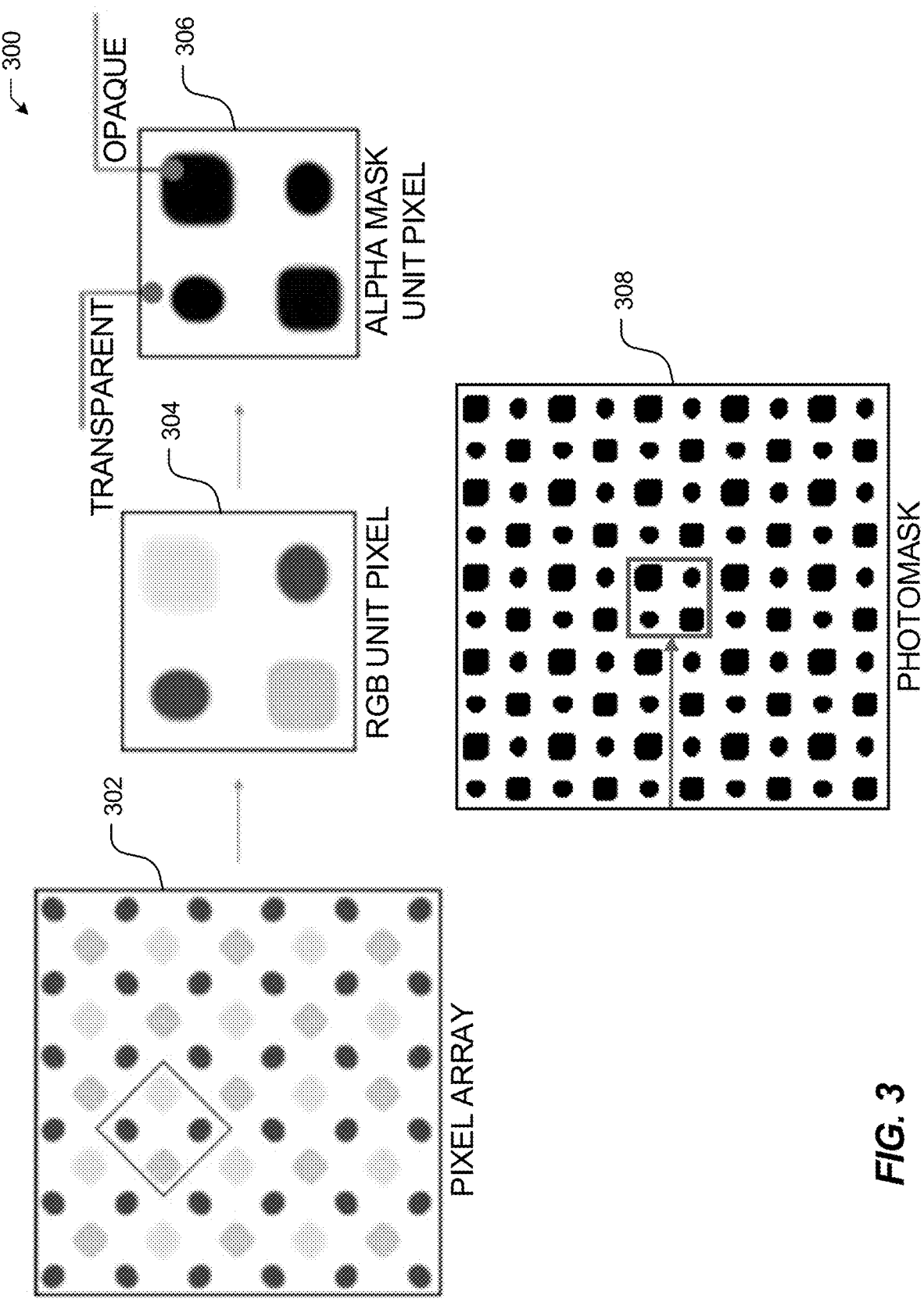
FIG. 3 illustrates a diagram of a pixel array, an RGB unit pixel, an alpha mask unit pixel, and a photomask.

FIG. 3 illustrates a diagram 300 of a pixel array 302, an RGB unit pixel 304, and an alpha mask unit pixel 306, and a photomask 308. The photomask 308 illustrates one example of light modulation by the semi-transparent display panel 112. In particular embodiments, the pixel array 302 may include, for example, a 50 micrometer (μm) AMOLED pixel array, including a number of RGB unit pixels 304 and an alpha mask unit pixel 306 (e.g., illustrated the highlight square within the pixel array 302 and the highlight square within the photomask 308). In particular embodiments, alpha mask unit pixel 306 may correspond to the semi-transparent pixel region within the pixel array 302 and the photomask 308 through which the one or more cameras 110 disposed behind the display 112 may detect light, and, by extension, capture images. In particular embodiments, the photomask 308 may facilitate the light path 202 through the display 112 (e.g., through the photomask 308 and alpha mask unit pixel 306). In particular embodiments, the photomask 308 may include, for example, a fill factor of approximately 50%, in which the illustrated white regions of the photomask 308 may correspond to transparent regions of the photomask 308 while the illustrated black regions may correspond to opaque regions of the photomask 308. In particular embodiments, the alpha mask unit pixel 306 and the photomask 308 may be utilized for testing, simulation, development, and/or calibration purposes.

Figure 4A:
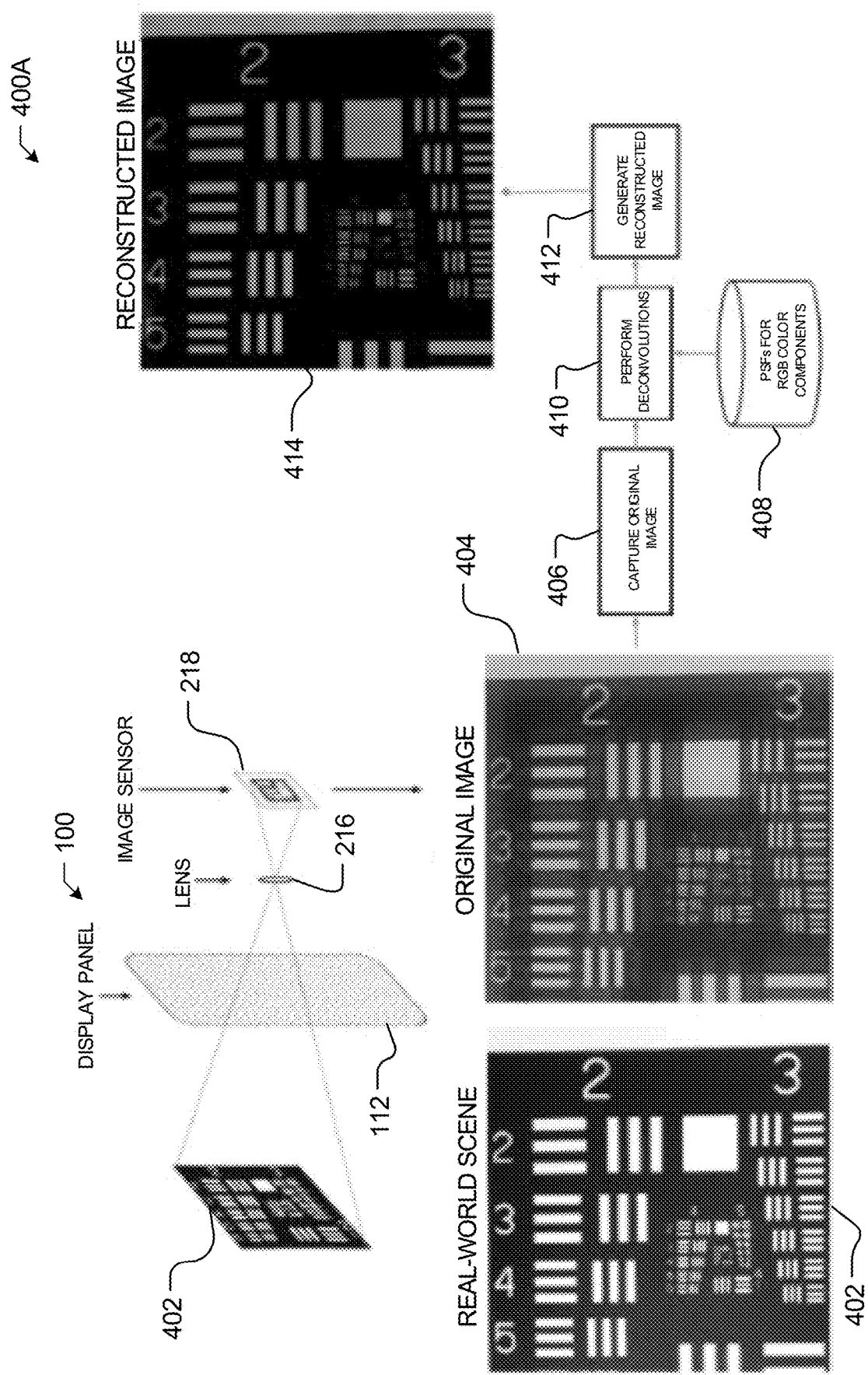
FIG. 4A illustrates an example system and workflow diagram for reconstructing images captured by a camera disposed behind a display of the electronic device.

FIG. 4A illustrates an example system and workflow diagram 400A for reconstructing images captured by a camera disposed behind a display of an electronic device, in accordance with the presently disclosed embodiments. In particular embodiments, the electronic device 100 may capture, by the image sensor 218 disposed behind a display panel 112 of the electronic device 100, an image of a real-world scene 402. In particular embodiments, the image of the real-world scene 402 captured by the image sensor 218 may correspond to an original image 404. In particular embodiments, based on the image of the real-world scene 402 being captured by the image sensor 218 through the display panel 112, the original image 404 may be degraded (e.g., blurred or distorted). In particular embodiments, after performing (at functional block 406) the capturing of the original image 404, the electronic device 100 may retrieve, for one or more pixel regions of the original image 404, the PSFs (e.g., a function of 3D diffraction pattern of light emitted from an imperceptibly small point light source and captured by one or more image sensors 218) for each of the RGB color components of the original image 404. In particular embodiments, that may be stored on the electronic device 100. In particular embodiments, the electronic device 100 may determine the respective PSF for each of the RGB color components by selecting (at functional block 408), from the memory 106 of the electronic device 100, the premeasured PSFs for each of the RGB color components. In particular embodiments, the electronic device 100 may determine multiple PSFs in various pixel regions of the real-world scene 402 to capture the PSFs' variation with the angle of incidence to the optical axis of the display panel 112, for example.

In particular embodiments, electronic device 100 may then perform (at functional block 410), for the number of pixel regions of the original image 404, a deconvolution of each of the RGB color components of the original image 404 based on their respective PSFs. In particular embodiments, the electronic device 100 may perform the deconvolution of each of the RGB color components by performing a Richardson-Lucy deconvolution of each of the RGB color components or by performing a Tikhonov regularized inverse filter deconvolution of each of the RGB color components. In particular embodiments, other deconvolution techniques may be utilized. In particular embodiments, the electronic device 100 may then generate (at functional block 412) a reconstructed image 414 corresponding to the original image 404 based on the deconvolutions of each of the RGB color components. As illustrated by comparison of the original image 404 to the reconstructed image 414, the electronic device 100 may generate the reconstructed image 414 by removing a blurring effect of the original image 404.

In this way, the present embodiments may increase the viewing area and the resolution of the display 112 of the electronic device 100 by disposing one or more front-facing cameras 110 of the electronic device 100 behind the display 112. For example, because of the increase in display area (e.g., having eliminated the display area typically designated for the one or more front-facing cameras 110), the electronic device 100 may further provide for improved (GUIs) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device 100, as well as allow a user of the electronic device 100 to display higher resolution images on the display 112 of the electronic device 100. Still further, because the one or more front-facing cameras 110 may be placed behind the display 112, the present techniques may allow the one or more front-facing cameras 110 to be placed anywhere, such as in a center area of the display 112 (e.g., as opposed to in a corner or along an edge of the display 112) of the electronic device 100. This may provide an improved user experience and/or GUI, such as by directing a user taking a selfie to gaze at the center area of the display 112, and further by giving the impression of eye-to-eye contact with another user when the user is participating in a videoconference, a videotelphonic exchange, or other video-streaming service.

Figure 4B:
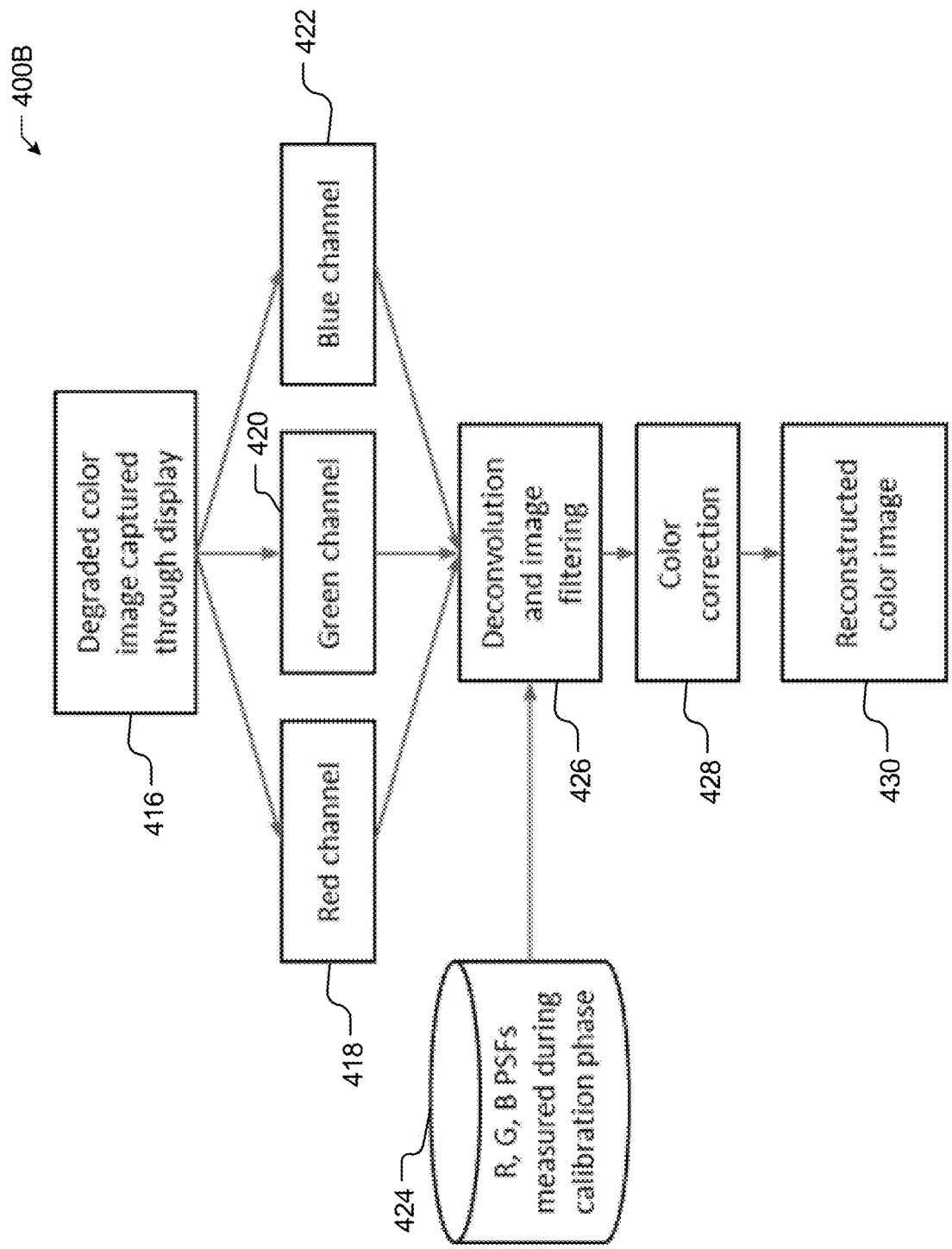
FIG. 4B illustrates a flow diagram for specifically reconstructing color images captured by a camera disposed behind a display of the electronic device.

FIG. 4B illustrates a flow diagram 400B for specifically reconstructing color images captured by a camera disposed behind a display of an electronic device, in accordance with the presently disclosed embodiments. In particular embodiments, the electronic device 100 (at block 416) may split a captured degraded color image into the individual the R(ed) color components 418, (G)reen color components 420, and (B)lue color components 422. In particular embodiments, the electronic device 100 may deconvolve and filter (e.g., Richardson-Lucy deconvolution, Tikhonov regularized inverse filter deconvolution) the individual the R(ed) color components 418, (G)reen color components 420, and (B)lue color components 422 based on, for example, their respective PSFs. In particular embodiments, the respective PSFs may be premeasured (e.g., determined experimentally) at a time in which, for example, the electronic device 100 is calibrated and/or manufactured. In particular embodiments, the electronic device 100 may then perform (at block 428) a color correction of each of the R(ed) color components 418, (G)reen color components 420, and (B)lue color components 422 to generate (at block 430) the reconstructed image based at least in part thereon.

Figure 5A:
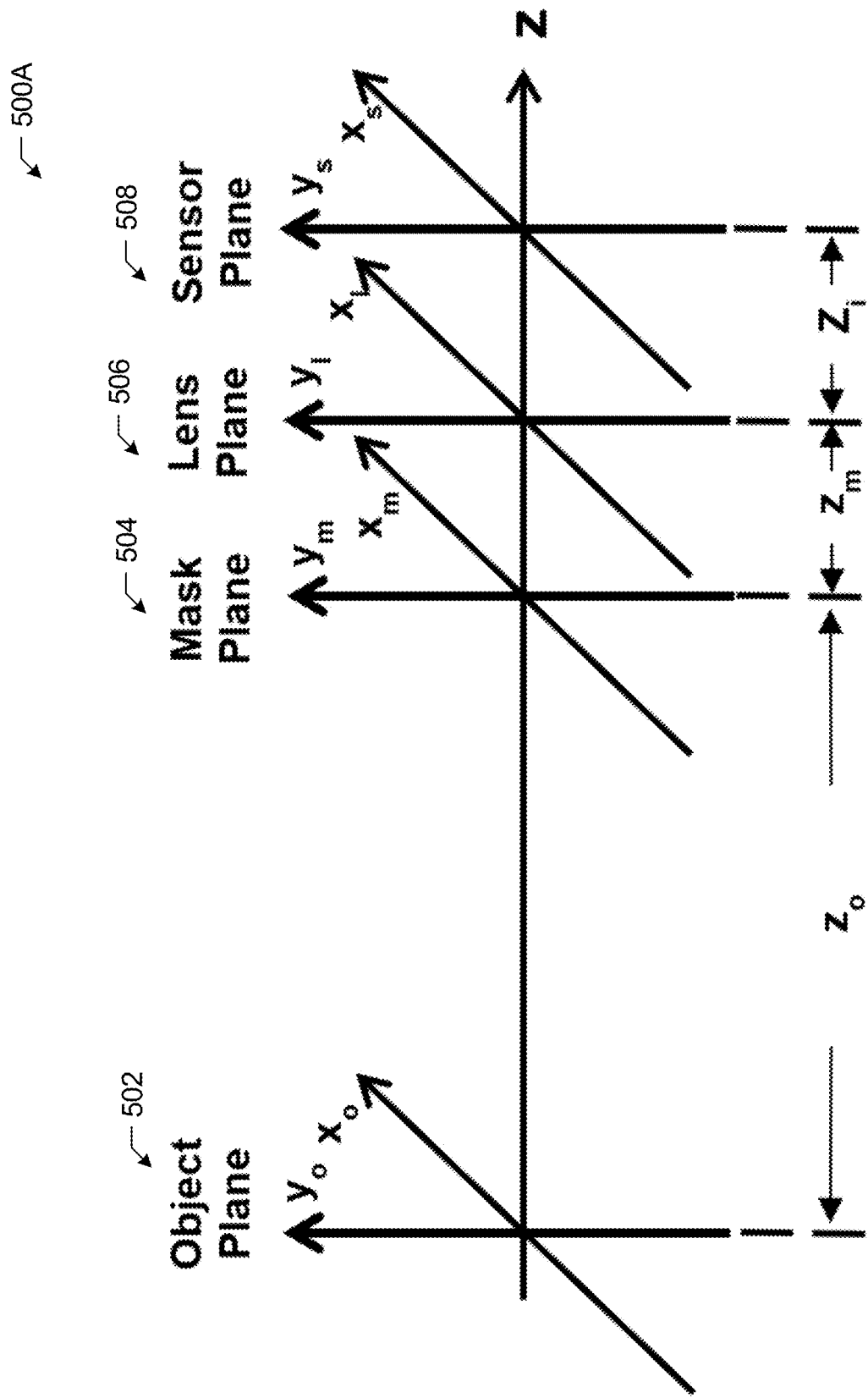
FIG. 5A illustrates a reference coordinate system by which one or more point spread functions (PSFs) may be derived based thereon.

FIG. 5A illustrates a reference coordinate system 500A by which one or more point spread functions (PSFs) may be derived based thereon, in accordance with presently disclosed embodiments. As depicted, the reference coordinate system 500A may include an object plane 502, a photomask 504, a lens plane 506, and a sensor plane 508. In particular embodiments, because the object light field may be polychromatic and spatially incoherent, incoherent image formation theory may be utilized to find the image intensity distribution at each wavelength and integrated over the Bayer filter transmission spectrum to obtain measured image intensity in R(ed) color components, (G)reen color components, and (B)lue color components. In particular embodiments, the image intensity distribution for an incoherent image system may be considered as the incoherent addition of spatial distribution of image intensity from constituent object points. Particularly, the image intensity distribution of one object point emitting at one unit radiant exitance is known as the point spread function (PSF), and may be thought of approximately as the spatial impulse response of the optical system. If the optical system is linear and spatially invariant, then the image intensity distribution of an extended object will be the incoherent superposition of these PSFs multiplied by the corresponding object point intensities.

For example, assuming that the wavelength is $\lambda$ and the light field emitted from a point in the object plane 502 is $O(0, 0, \lambda)$: because the wavelength and phase are known, the light field from this point source is coherent. The light field after being modulated by the photomask may be expressed as:

$$O_m(x_m, y_m, \lambda) = \frac{M(x_m, y_m)O(0, 0, \lambda)}{j\lambda z_o} \exp\left[\frac{j\pi}{\lambda z_o}(x_m^2 + y_m^2)\right], \quad \text{(Equation 1)}$$

where $M(x_m, y_m)$ is the mask distribution at the photomask plane 504 and j is the imaginary unit $\sqrt{-1}$. This light field may propagate a distance of $z_m$ and pass through a lens (e.g., lens 216) at the lens plane 506. The light field after the lens (e.g., lens 216) may be expressed as:

$$O_l(x_l, y_l, \lambda) = \frac{P(x_l, y_l, \lambda)\exp\left[\frac{-j\pi}{\lambda f}(x_l^2 + y_l^2)\right]}{j\lambda z_m} \quad \text{(Equation 2)}$$
$$\int\int O_m(x_m, y_m, \lambda)\exp\left\{\frac{j\pi}{\lambda z_m}[(x_l - x_m)^2 + (y_l - y_m)^2]\right\}.$$

In Equation (2), $P(x_l, y_l, \lambda)$ represents the phase aberration introduced by the lens (e.g., lens 216), and f denotes the focal length of the lens (e.g., lens 216). The light field at the sensor plane 508 may be expressed as:

$$O_s(x_s, y_s, \lambda) = \quad \text{(Equation 3)}$$
$$\frac{1}{j\lambda z_i}\int\int O_l(x_l, y_l, \lambda)\exp\left\{\frac{j\pi}{\lambda z_i}[(x_s - x_l)^2 + (y_s - y_l)^2]\right\}.$$

Figure 5B:
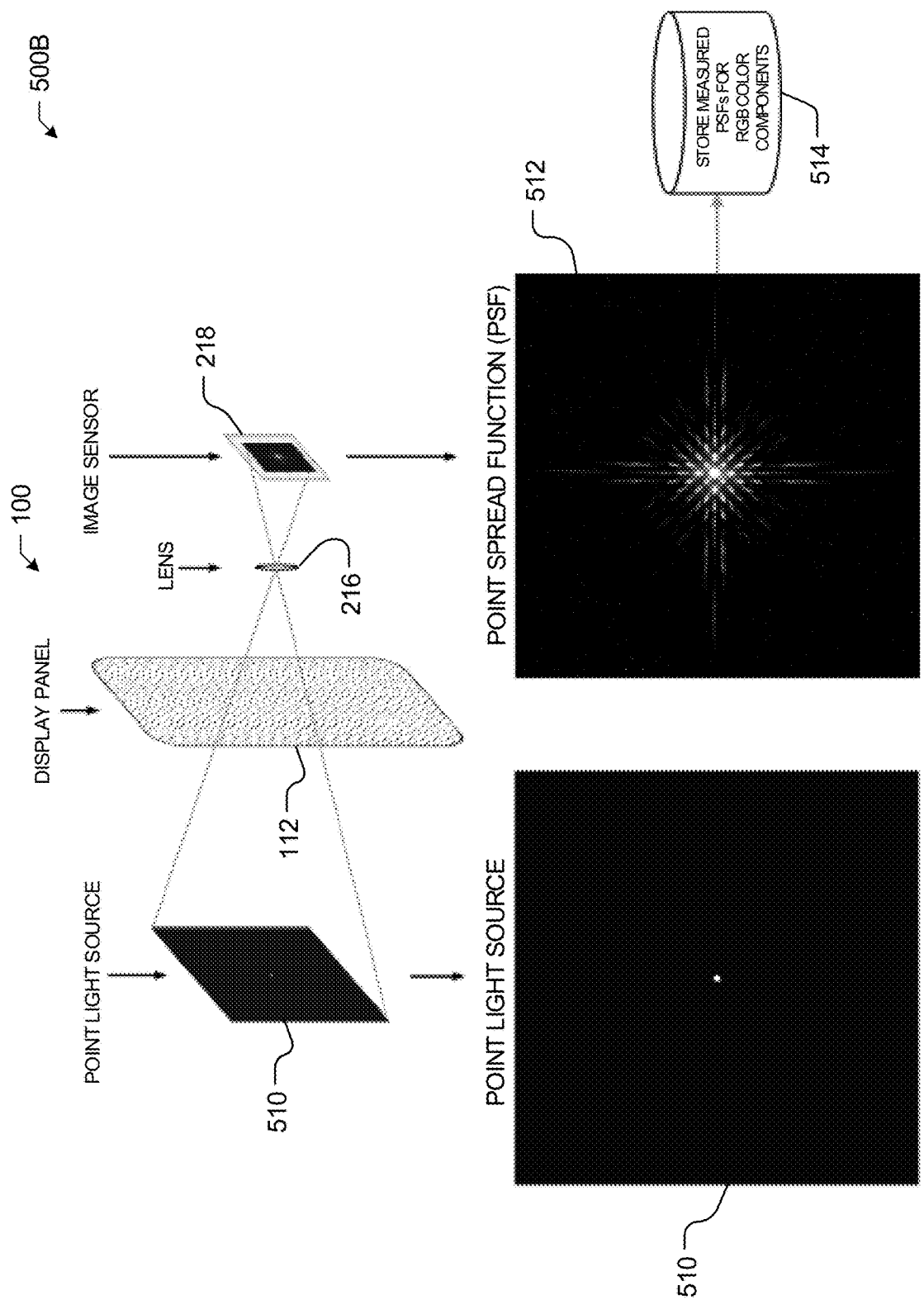
FIG. 5B illustrates an example system and workflow diagram for measuring and storing the point spread function (PSF) of an electronic device.

FIG. 5B illustrates an example system and workflow diagram 500B for measuring and determining one or more premeasured point spread functions (PSFs) (e.g., individually for each of the RGB color components and/or one or more particular monochromatic color components) of an electronic device, in accordance with the presently disclosed embodiments. For example, the reference coordinate system 500A may be utilized as the basis for measuring and determining one or more PSFs. In particular embodiments, to reconstruct a degraded original image, the electronic device 100 may premeasure (e.g., determine experimentally during a calibration process and/or manufacturing process of the electronic device 100) and store the PSFs of the electronic device 100. In particular embodiments, as depicted by FIG. 5B, point light source 510 (e.g., a white LED or an array of white LEDs) may emit a light wave into the direction of the electronic device 100 through, for example, a pinhole or other imperceptibly small aperture. In particular embodiments, the light wave may pass through, for example, the photomask 308, the camera lens 216, and may be ultimately detected by the image sensor 218. In particular embodiments, the electronic device 100 may then premeasure the one or more PSFs 512 for each of the RGB color components and/or one or more particular monochromatic color components based on, for example, a sampling of a transfer function corresponding to an effect of the mphotomask 308 in response to the point light source 510.

For example, in particular embodiments, the one or more PSFs of the electronic device 100 may represent the intensity response of the point light source 510. In particular embodiments, the one or more PSFs may each be expressed as:

$$h(x_s, y_s, \lambda) = |O_s(x_s, y_s, \lambda)|^2 \quad \text{(Equation 4)}.$$

In particular embodiments, the image intensity distribution may include a convolution of the one or more PSFs (e.g., for each of the RGB color components and/or one or more particular monochromatic color components) and the real-world scene 402 intensity distribution scaled by magnification. Therefore, the image intensity distribution $I_S$ incident on the image sensor 218, for example, may be expressed as:

$$I_S(x_s, y_s, \lambda) = I_O(x_s, y_s, \lambda) \otimes h(x_s, y_s, \lambda) \otimes h(x_s, y_s, \lambda), \text{ where}$$
$$I_O(x_s, y_s, \lambda) = |O(x_s, y_s, \lambda)|^2 \quad \text{(Equation 5)}.$$

In Equation (5), $(x_s, y_s)$ may represent spatial coordinates at the image sensor 218 plane, $\lambda$ may represent wavelength, and $\otimes$ may denote the convolution operation. In particular embodiments, before the light wave generated by the point light source 510 is detected by the image sensor 218, the light wave may pass through a Bayer filter for each of the RGB color components and/or one or more particular monochromatic color components. The final image intensity at each pixel of each RGB channel may be expressed as:

$$I_{S,K}(x_s, y_s) = \int I_O(x_s, y_s, \lambda) \otimes [F_K(\lambda)h(x_s, y_s, \lambda)]d\lambda, \quad \text{(Equation 6)}$$

In Equation (6), K takes R, G, or B, while $F_K(\lambda)$ may represent the spectral transmittance of the Bayer filter, the display panel 112, and the camera lens 216 at K channel. Thus, assuming that within each RGB channel the intensity distribution does not vary much as wavelength, Equation (6) may be simplified and expressed as:

$$I_{S,K}(x_s, y_s) = I_O(x_s, y_s, K) \otimes \int [F_K(\lambda)h(x_s, y_s, \lambda)]d\lambda = \quad \text{(Equation 7)}$$
$$I_{O,K}(x_s, y_s) \otimes h_K(x_s, y_s).$$

In Equation (7), $I_{O,K}$ may represent the average intensity distribution over the spectrum at channel K. Further, in Equation (7), $h_K$ may represent the integrated PSF over the spectrum at channel K. Equation (7) shows how the image intensity distribution at K channel is related to the one or more PSFs, which is degraded mainly by the effect of the photomask 308, for example, and partly based on one or more potential aberrations with respect to the camera lens 216. In particular embodiments, the point light source 510 detection process may, in some instances, introduce noises, such as Poisson noise, dark current noise, readout noise, or quantization noise. Thus, in particular embodiments, noting that $N_K$ is the spatial distribution of noise at channel K, the actual image intensity distribution corresponding to the one or more PSFs of the electronic device 100 may be expressed as:

$$I_{S,K}(x_s, y_s) = I_{O,K}(x_s, y_s) \otimes h_K(x_s, y_s) + N_K(x_s, y_s) \quad \text{(Equation 8)}.$$

In particular embodiments, the electronic device 100 may then store (at database 514) the one or more premeasured PSFs 512 (e.g., for each of the RGB color components and/or one or more particular monochromatic color components) into, for example, the memory 106 to be later utilized to reconstruct images captured by the camera 110 disposed behind the display 112 of the electronic device 100. In particular embodiments, multiple PSFs may be premeasured in different regions of the image field to capture the PSFs' variation with the angle of incidence to the optical axis of the display panel 112, for example. These multiple PSFs (e.g., for each of the RGB color components and/or one or more particular monochromatic color components) may be stored into, for example, the memory 106 to be later utilized to reconstruct pixel regions of images captured by the camera 110 disposed behind the display 112 of the electronic device 100, and those reconstructed pixel regions may be then combined into the full reconstructed image.

Figure 6:
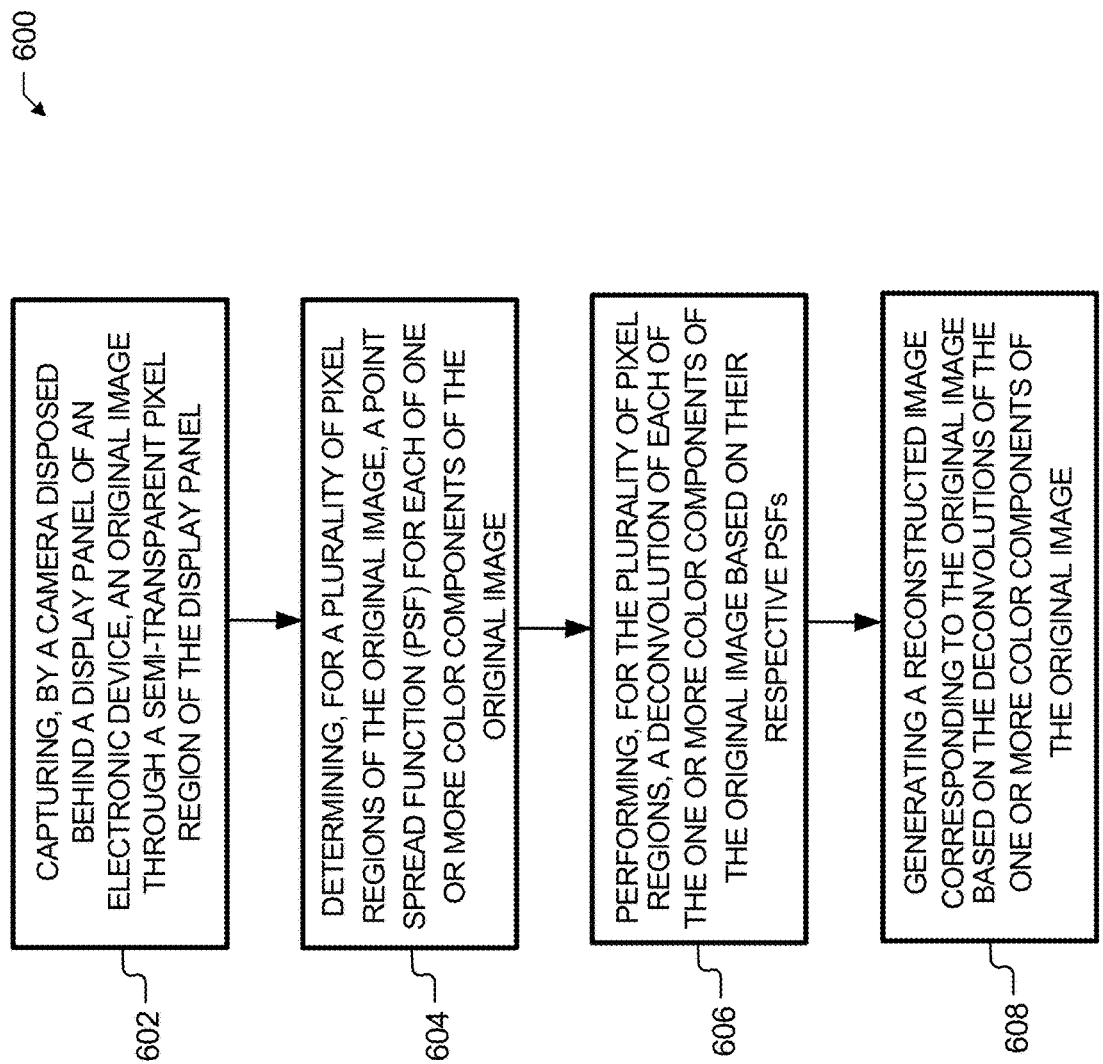
FIG. 6 illustrates a flow diagram of a method for reconstructing an image captured by a camera disposed behind a display of an electronic device formats.

FIG. 6 illustrates is a flow diagram of a method 600 for reconstructing images captured by a camera disposed behind a display of an electronic device, in accordance with the presently disclosed embodiments. The method 600 may be performed utilizing one or more processing devices (e.g., the one or more processors 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. In particular embodiments, one or more blocks of the method 600 may be performed only once or on an as-needed (e.g., per request/instruction) basis, such as when a photograph is being captured. In particular embodiments, one or more blocks of the method 600 may be performed continuously and/or iteratively (e.g., automatically running multiple times over a duration of time), such as when a video is being recorded or when a camera application is executing a viewfinder/camera-preview is being continuously displayed.

The method 600 may begin block 602 with the one or more processing devices (e.g., electronic device 100) capturing, by a camera disposed behind a display panel of the electronic device, an original image through a semi-transparent pixel region of the display panel, in which the original image includes one or more color components. For example, in particular embodiments, the electronic device may capture, by the one or more cameras disposed behind a display panel of the electronic device, an original image through a semi-transparent pixel region of the display panel. The original image includes red color components, green color components, and blue color components. In particular embodiments, the original image may include a bit depth N=10, which incorporates various color components. In particular embodiments, other values for the bit depth are possible (e.g., N=2, N=8, or N=12, etc.). The method 600 may then continue at block 604 with the one or more processing devices (e.g., electronic device 100) determining, for a plurality of pixel regions of the original image, a point spread function (PSF) for each of the one or more color components. For example, in particular embodiments, the electronic device may determine the PSF for each of the one or more color components by selecting, from a memory of the electronic device, a plurality of premeasured PSFs corresponding to the one or more color components, respectively. In particular embodiments, the respective PSFs may be premeasured based at least in part on a predetermined calibration process performed with respect to the camera and the display panel.

The method 600 may then continue at block 606 with the one or more processing devices (e.g., electronic device 100) performing, for the plurality of pixel regions of the original image, a deconvolution of each of the one or more color components of the original image based at least in part on their respective PSFs. In particular embodiments, performing the deconvolution of each of the number of color components may include performing a Richardson-Lucy deconvolution of each of the number of color components. In particular embodiments, performing the deconvolution of each of the number of color components may include performing a Tikhonov regularized inverse filter deconvolution of each of the number of color components.

The method 600 may then conclude at block 608 with the one or more processing devices (e.g., electronic device 100) generating a reconstructed image corresponding to the original image based on the deconvolutions of the one or more color components of the plurality of pixel regions of the original image. In particular embodiments, generating the reconstructed image corresponding to the original image may include removing a blurring effect of the original image. In particular embodiments, generating the reconstructed image corresponding to the original image may also include performing a color correction of each of the number of color components of the plurality of pixel regions of the original image.

For example, in particular embodiments, techniques by which the reconstructed image may be generated may be expressed by Equations (9) and (10) below. For example, the acquired image $I_{S,K}$ may be degraded by the photomask, optical aberration, and detection noise. To recover the underlying ideal object intensity $I_{O,K}$, Equation (9) may be inverted based on deconvolution techniques. To perform deconvolution, the PSF for each RGB channel by experimental measurement or by software generation through the wave optics may be performed, for example, as discussed above with respect to FIGS. 5A and 5B. This inverse expression may be expressed as:

$$\underset{\{\tilde{I}_{O,K}\}}{\arg\min} \left\| \tilde{I}_{O,K}(x_s, y_s) \otimes h_K(x_s, y_s) - I_{S,K}(x_s, y_s) \right\|_2^2 + \quad \text{(Equation 9)}$$

$$g(|\nabla \tilde{I}_{O,K}(x_s, y_s)|).$$

The solution $\tilde{I}_{O,K}(x_s, y_s)$ of this optimization expression may include an estimate of the true object intensity. The second term may include a regularization function that depends on the total variation, enforcing sparsity of gradients in the reconstructed image. In the simulation and experiment, the simulated PSF $h_K$ may be utilized to solve Equation (9). Richardson-Lucy deconvolution (or Tikhonov regularized inverse filter deconvolution) may be utilized. The regularization term will not be applied for the moment. Richardson-Lucy may include a deconvolution technique based on the assumption that the main noise source is Poisson noise, which may be expressed as:

$$\tilde{I}_{O,n+1} = \tilde{I}_{O,n+1} \left\{ \frac{I_S}{\tilde{I}_{O,n+1} \otimes h} \otimes h^* \right\} \quad \text{(Equation 10)}$$

In the Equation (10), the channel K may be dropped for simplicity, and n may be the iteration number and the asterisk is the adjoint operation.

In this way, the present embodiments may increase the viewing area and the resolution of the display of the electronic device by disposing one or more front-facing cameras of the electronic device behind the display. For example, because of the increase in display area (e.g., having eliminated the display area typically designated for the one or more front-facing cameras), the electronic device may further provide for improved graphical user interfaces (GUI) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device, as well as allow a user of the electronic device to display higher resolution images on the display of the electronic device. Still further, because the one or more front-facing cameras may be placed behind the display, the present techniques may allow the one or more front-facing cameras to be placed anywhere (e.g., in a center area of the display), as opposed to in a corner or along an edge of the display of the electronic device. This may provide an improved user experience and/or GUI, such as by directing a user taking a selfie to gaze at the center area of the display and further by giving the impression of eye-to-eye contact with another user when the user is participating in a videoconference, a videotelphonic exchange, or other video-streaming service.

Figure 7:
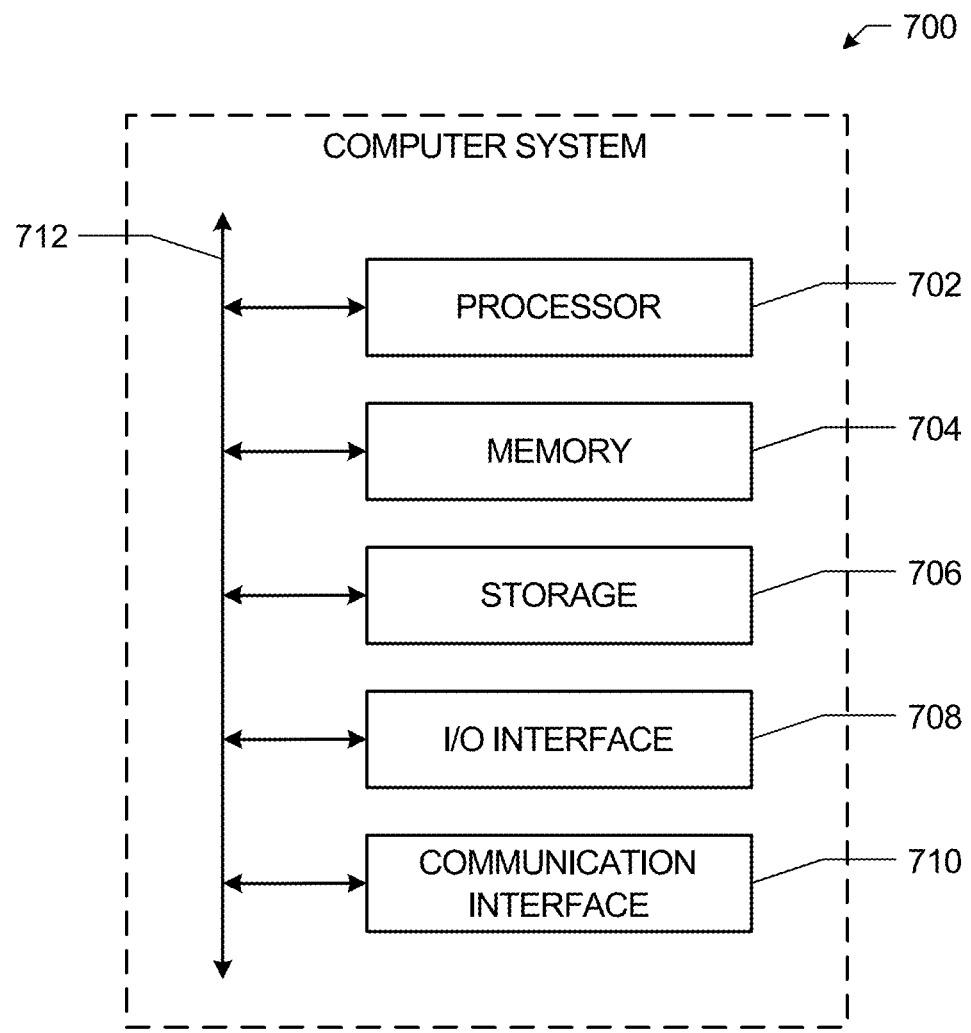
FIG. 7 illustrates an example computer system.

FIG. 7 illustrates an example computer system 700 that may be utilized for reconstructing images captured by a camera disposed behind a display of an electronic device, in accordance with the presently disclosed embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
   capturing, by a camera disposed behind a display panel of the electronic device, an original image through a semi-transparent pixel region of the display panel, wherein the original image comprises one or more color components;
   creating a reconstructed image, corresponding to the original image, that corrects for a modulation of light passing through the semi-transparent pixel region of the display panel, comprising:
      determining, for each of a plurality of pixel regions of the original image, a point spread function (PSF) for the respective pixel region for each of the one or more of color components;
      performing, for the plurality of pixel regions of the original image, a deconvolution of each of the one or more color components of the original image based at least in part on their respective PSFs; and
      generating the reconstructed image based on the deconvolutions of the one or more color components of the plurality of pixel regions of the original image.

2. The method of claim 1, wherein the one or more color components comprises:
   a red color component;
   a green color component; and
   a blue color component.

3. The method of claim 1, wherein determining the PSF for the respective pixel region for each of the one or more color components comprises selecting, from a memory of the electronic device, a plurality of premeasured PSFs corresponding to the one or more color components, respectively.

4. The method of claim 1, wherein the respective PSFs are premeasured based at least in part on a predetermined calibration process performed with respect to the camera and the display panel.

5. The method of claim 1, wherein performing, for the plurality of pixel regions of the original image, the deconvolution of each of the one or more color components comprises performing a Richardson-Lucy deconvolution of each of the one or more color components.

6. The method of claim 1, wherein performing, for the plurality of pixel regions of the original image, the deconvolution of each of the one or more color components comprises performing a Tikhonov regularized inverse filter deconvolution of each of the one or more color components.

7. The method of claim 1, wherein generating the reconstructed image corresponding to the original image comprises removing a blurring effect of the original image.

8. The method of claim 1, wherein generating the reconstructed image corresponding to the original image comprises performing a color correction of each of the one or more color components of the plurality of pixel regions of the original image.

9. An electronic device comprising:
   a display panel;
   a camera disposed behind the display panel;
   one or more non-transitory computer-readable storage media including instructions; and
   one or more processors coupled to the storage media and the camera, the one or more processors configured to execute the instructions to:
      capture, by the camera, an original image through a semi-transparent pixel region of the display panel, wherein the original image comprises one or more color components;
      create a reconstructed image, corresponding to the original image, that corrects for a modulation of light passing through the semi-transparent pixel region of the display panel, comprising:
         determine, for a plurality of pixel regions of the original image, a point spread function (PSF) for each of the one or more color components;

perform, for the plurality of pixel regions of the original image, a deconvolution of each of the one or more color components of the original image based at least in part on their respective PSFs; and generate the reconstructed image based on the deconvolutions of the one or more color components of the plurality of pixel regions of the original image.

10. The electronic device of claim 9, wherein the one or more color components comprises:
a red color component;
a green color component; and
a blue color component.

11. The electronic device of claim 9, wherein the instructions to determine the PSF for each of the one or more color components comprises instructions to select, from a memory of the electronic device, a plurality of premeasured PSFs corresponding to the one or more color components, respectively.

12. The electronic device of claim 9, wherein the respective PSFs are premeasured based at least in part on a predetermined calibration process performed with respect to the camera and the display panel.

13. The electronic device of claim 9, wherein the instructions to perform, for the plurality of pixel regions of the original image, the deconvolution of each of the one or more color components comprises instructions to perform a Richardson-Lucy deconvolution of each of the one or more color components.

14. The electronic device of claim 9, wherein the instructions to perform, for the plurality of pixel regions of the original image, the deconvolution of each of the one or more color components comprises instructions to perform a Tikhonov regularized inverse filter deconvolution of each of the one or more color components.

15. The electronic device of claim 9, wherein the instructions to generate the reconstructed image corresponding to the original image comprises instructions to remove a blurring effect of the original image.

16. The electronic device of claim 9, wherein the instructions to generate the reconstructed image corresponding to the original image comprises instructions to perform a color correction of each of the one or more color components of the plurality of pixel regions of the original image.

17. A non-transitory computer-readable medium comprising instructions that, when executed by one or more processors of an electronic device, cause the one or more processors to:

capture, by a camera disposed behind a display panel of the electronic device, an original image through a semi-transparent pixel region of a display panel, wherein the original image comprises one or more color components;

create a reconstructed image, corresponding to the original image, that corrects for a modulation of light passing through the semi-transparent pixel region of the display panel, comprising:

determine, for a plurality of pixel regions of the original image, a point spread function (PSF) for each of the one or more color components;

perform, for the plurality of pixel regions of the original image, a deconvolution of each of the one or more color components of the original image based at least in part on their respective PSFs; and generate the reconstructed image based on the deconvolutions of the one or more color components of the plurality of n pixel regions of the original image.

18. The non-transitory computer-readable medium of claim 17, wherein the one or more color components comprises:
a red color component;
a green color component; and
a blue color component.

19. The non-transitory computer-readable medium of claim 17, wherein the instructions to perform, for the plurality of pixel regions of the original image, the deconvolution of each of the one or more color components comprises instructions to perform a Richardson-Lucy deconvolution of each of the one or more color components.

20. The non-transitory computer-readable medium of claim 17, wherein the instructions to perform, for the plurality of pixel regions of the original image, the deconvolution of each of the one or more color components comprises instructions to perform a Tikhonov regularized inverse filter deconvolution of each of the one or more color components.

* * * * *